(12) United States Patent
Cui et al.

(10) Patent No.: US 10,437,254 B2
(45) Date of Patent: Oct. 8, 2019

(54) CONTROL METHOD, DEVICE AND SYSTEM OF ROBOT AND ROBOT USING THE SAME

(71) Applicants: ANKOBOT (SHENZHEN) SMART TECHNOLOGIES CO., LTD., Guangdong (CN); ANKOBOT (SHANGHAI) SMART TECHNOLOGIES CO., LTD., Shanghai (CN)

(72) Inventors: Yuwei Cui, Shanghai (CN); Xiru Hou, Shanghai (CN)

(73) Assignees: ANKOBOT (SHENZHEN) SMART TECHNOLOGIES CO., LTD., Guangdong (CN); ANKOBOT (SHANGHAI) SMART TECHNOLOGIES CO., LTD., Shanghai (CN)

( * ) Notice: Subject to any disclaimer, the term of this patent is extended or adjusted under 35 U.S.C. 154(b) by 0 days.

(21) Appl. No.: 16/246,180

(22) Filed: Jan. 11, 2019

(65) Prior Publication Data

US 2019/0146521 A1 May 16, 2019

Related U.S. Application Data

(63) Continuation of application No. PCT/CN2018/097953, filed on Aug. 1, 2018.

(30) Foreign Application Priority Data

Aug. 2, 2017 (CN) .......................... 2017 1 0652836

(51) Int. Cl.
*G05D 1/02* (2006.01)
*A47L 11/40* (2006.01)

(52) U.S. Cl.
CPC ........ *G05D 1/0246* (2013.01); *A47L 11/4011* (2013.01); *G05D 1/02* (2013.01);
(Continued)

(58) Field of Classification Search
CPC .......... G06Q 10/08; G01C 21/34; G05D 1/02; B61D 15/00; B25J 11/0015; A47L 11/4011; A23F 5/04; F16H 57/04
See application file for complete search history.

(56) References Cited

U.S. PATENT DOCUMENTS

| | | | |
|---|---|---|---|
| 9,978,149 B1 | 5/2018 | Zhang et al. | |
| 2013/0223673 A1* | 8/2013 | Davis | G06K 9/78 382/100 |
| 2017/0329347 A1* | 11/2017 | Passot | A47L 11/4011 |

FOREIGN PATENT DOCUMENTS

| | | |
|---|---|---|
| CN | 1381340 A | 11/2002 |
| CN | 104063711 A | 9/2014 |
| CN | 106541407 A | 3/2017 |

OTHER PUBLICATIONS

International Application No. PCT/CN2018/097953 Search Report and Written Opinion dated Nov. 15, 2018.

* cited by examiner

*Primary Examiner* — Yonel Beaulieu
*Assistant Examiner* — Martin A Weeks
(74) *Attorney, Agent, or Firm* — Leber IP Law; David C. Robertson

(57) ABSTRACT

The present application provides a control method, a device and a system of the robot and a robot using the same. The control method comprises: acquiring at least one image captured during a movement of the robot and identifying characteristic line segments in the at least one image; determining a relative orientation relationship between the robot and a room divider in a physical space according to the (Continued)

--- at least one image captured during a movement of the robot is acquired and characteristic line segments in the image are identified — S110 a relative orientation relationship between the robot and a room divider in a physical space is determined according to the identified characteristic line segments — S120 a pose of the robot is adjusted according to the orientation relationship, such that the robot moves along a principal direction constructed based on the room divider in the physical space — S130 identified characteristic line segments; and adjusting a pose of the robot according to the orientation relationship, such that the robot moves along a principal direction constructed based on the room divider in the physical space. Through the technical solution in the preset application, the movement coverage rate of robot can be improved.

20 Claims, 6 Drawing Sheets

(52) U.S. Cl.
CPC ........ *G05D 1/0219* (2013.01); *A47L 2201/04* (2013.01); *G05D 2201/0215* (2013.01)

CONTROL METHOD, DEVICE AND SYSTEM OF ROBOT AND ROBOT USING THE SAME

RELATED APPLICATION

This application is a continuation application of International Patent Application No. PCT/CN2018/097953 filed on Aug. 1, 2018, which claims priority to Chinese Patent Application No. 201710652836.3, filed Aug. 2, 2017, the entire contents of which are hereby incorporated by reference.

TECHNICAL FIELD

The present application relates to the field of intelligent robots, particularly to a control method, a device and a system of the robot and a robot using the same.

BACKGROUND

Along with the development of science and technology, an intelligent robots have gradually become an important part of our life. In practical applications, the intelligent robot can be operated under the command of human operators or in pre-programmed programs, and can act according to principles set out by the artificial intelligence technology as well. This type of robot can be used indoors or outdoors, and can be used in industry or household. For example, the robot can be used to replace security guards to perform patrol, or replace people to clean the surface. The robot can also be used to accompany family members or assist in doing office work.

With a cleaning robot as an example, in order to improve the cleaning efficiency, it is ideal to automatically adjust a pose of the cleaning robot such that the robot moves along a principal direction before the cleaning robot performs cleaning operations. Wherein, the principal direction for example may be a direction formed by a wall, that is, the robot moves along a direction which is vertical to or in parallel with the wall, and then performs cleaning operations, so that regions for additional cleaning can be reduced as far as possible during cleaning, and the cleaning efficiency can be improved. Therefore, It is a key factor of improving the cleaning efficiency that how to adjust a pose of the robot accurately such that the robot can move along a principal direction.

SUMMARY

In view of the above defects in the prior art, the objective of the present application is to provide a control method, a device and a system of a robot and a robot using the same, so as to solve the problem in the prior art of how to adjust a pose of the robot automatically such that the robot can move along a principal direction.

In one aspect, the present application provides a control device of a robot. The control device comprises: a storage unit, configured to store images captured by an image acquisition device and at least one program; and a processing unit, connected with the storage unit, and configured to execute the at least one program to perform the following steps: acquiring at least one image captured during a movement of the robot and identifying characteristic line segments in the at least one image; determining a relative orientation relationship between the robot and a room divider in a physical space according to the identified characteristic line segments; and adjusting a pose of the robot according to the orientation relationship, such that the robot moves along a principal direction constructed based on the room divider in the physical space.

In some embodiments, the step of determining a relative orientation relationship between the robot and a room divider in a physical space according to the identified characteristic line segments comprises: grouping each characteristic line segment based on vanishing points corresponding to multiple identified characteristic line segments; selecting at least one group of characteristic line segments from the grouped characteristic line segments; and determining the relative orientation relationship between the robot and the room divider in the physical space according to a position of a vanishing point corresponding to the selected group of characteristic line segments in an image coordinate system.

In some embodiments, the step of selecting at least one group of characteristic line segments from the grouped characteristic line segments comprises: selecting one group of characteristic line segments with the largest number of characteristic line segments.

In some embodiments, the step of adjusting a pose of the robot according to the orientation relationship comprises: adjusting the pose of the robot by a preset angle step according to the orientation relationship; and repeating the above steps until a preset condition is satisfied, the preset condition is used to determine whether the robot moves along a principal direction constructed based on the room divider.

In some embodiments, the step of determining whether the robot moves along a principal direction constructed based on the room divider comprises: determining whether characteristic line segments identified from a current image satisfy a preset parallel condition, if the preset parallel condition is satisfied, determining that a pose of the robot is consistent with the principal direction constructed based on the room divider, if the preset parallel condition is not satisfied, adjusting a pose of the robot continuously and repeating the above steps until the parallel condition is satisfied.

In some embodiments, the parallel condition comprises at least one of the following conditions: a distance error between two characteristic line segments which are not on the same straight line is smaller than or equal to a preset distance error threshold, or the position of a vanishing point corresponding to the selected group of characteristic line segments falls within a preset region.

In some embodiments, the acquired at least one image is captured by an image acquisition device which is arranged to be vertical to a plane over which the robot moves, and the step of determining a relative orientation relationship between the robot and a room divider in a physical space according to the identified characteristic line segments comprises: counting angles of inclination of characteristic line segments identified from the at least one image in a preset image coordinate system; and determining the relative orientation relationship between the robot and the room divider in the physical space according to the counted angles of inclination.

In some embodiments, the step of counting angles of inclination of characteristic line segments identified from the at least one image in a preset image coordinate system comprises any of the following steps: counting angles of inclination of characteristic line segments in one image in the preset image coordinate system; and within a time period of a pose adjustment, performing a regression process on an angle of inclination of each characteristic line segment in the acquired at least two images based on a rotating angle at which the robot moves when capturing the at least two images; and counting the regression processed angle of inclination of each characteristic line segment in the preset image coordinate system.

In some embodiments, the step of determining the relative orientation relationship between the robot and the room divider in the physical space according to the counted angles of inclination comprises: determining the relative orientation relationship between the robot and the room divider in the physical space according to counted angles of inclination in a peak interval.

In some embodiments, the step of adjusting a pose of the robot according to the orientation relationship comprises: adjusting the pose of the robot according to the counted angles of inclination and a current pose of the robot.

In some embodiments, the processing unit is further configured to perform the step of planning a navigation route based on a current position of the robot when determining that the robot moves along the principal direction constructed based on the room divider in the physical space.

In some embodiments, the navigation route comprises: a first route along which the robot moves towards the room divider, and a second route along which the robot traverses a preset region from an end point of the first route.

In another aspect, the present application provides a method for controlling a robot, the control method comprises: acquiring at least one image captured during a movement of the robot and identifying characteristic line segments in the at least one image; determining a relative orientation relationship between the robot and a room divider in a physical space according to the identified characteristic line segments; and adjusting a pose of the robot according to the orientation relationship, such that the robot moves along a principal direction constructed based on the room divider in the physical space.

In another aspect, the present application provides a robot. the robot comprises: an image acquisition device, configured to capture at least one image during a movement of the robot; a movement device, configured to adjust a pose of the robot according to a control instruction; a control device, connected with the image acquisition device and the movement device, and configured to perform the following steps: acquiring at least one image captured by the image acquisition device and identifying characteristic line segments in the at least one image; determining a relative orientation relationship between the robot and a room divider in a physical space according to the identified characteristic line segments; and controlling the movement device to adjust a pose of the robot according to the orientation relationship, such that the robot moves along a principal direction constructed based on the room divider in the physical space.

In some embodiments, an angle between an optic axis of the image acquisition device and a plane over which the robot moves is between 0° and 90°, and the image acquisition device captures at least one image during the movement of the robot and provides the at least one image for the control device; the step of determining a relative orientation relationship between the robot and a room divider in a physical space according to the identified characteristic line segments comprises: grouping each characteristic line segment based on the vanishing points corresponding to multiple identified characteristic line segments; selecting at least one group of characteristic line segments from the grouped characteristic line segments; and determining the relative orientation relationship between the robot and the room divider in the physical space according to a position of a vanishing point corresponding to the selected group of characteristic line segments in an image coordinate system.

In some embodiments, the step of selecting at least one group of characteristic line segments from the grouped characteristic line segments comprises: selecting one group of characteristic line segments with the largest number of characteristic line segments.

In some embodiments, the step of controlling the movement device to adjust a pose of the robot according to the orientation relationship comprises: controlling a rotating direction and a rotating angle of the movement device by a preset angle step according to the orientation relationship; and repeating the above steps until a preset condition is satisfied, the preset condition is used to determine whether the robot moves along a principal direction constructed based on the room divider.

In some embodiments, an optic axis of the image acquisition device is vertical to a plane over which the robot moves, and the image acquisition device captures at least one image during the movement of the robot and provides the at least one image for the control device; and the step of determining a relative orientation relationship between the robot and a room divider in a physical space according to the identified characteristic line segments comprises: counting angles of inclination of characteristic line segments identified from the at least one image in a preset image coordinate system; and determining the relative orientation relationship between the robot and the room divider in the physical space according to the counted angles of inclination.

In some embodiments, the control device is further configured to perform the step of planning a navigation route based on a current position of the robot when determining that the robot moves along the principal direction constructed based on the room divider in the physical space.

In some embodiments, the robot is a cleaning robot.

As mentioned above, the control method, the device and the system of the robot and the robot using the same in the present application have the following beneficial effects: through the technical solution that determining the relative orientation relationship between a robot and a room divider based on characteristic line segments in at least one image, the robot can adjust its pose according to the orientation relationship so as to move along a principal direction constructed based on a room divider, therefore, the movement coverage rate of robot can be improved.

DETAILED DESCRIPTION

Figure 1:
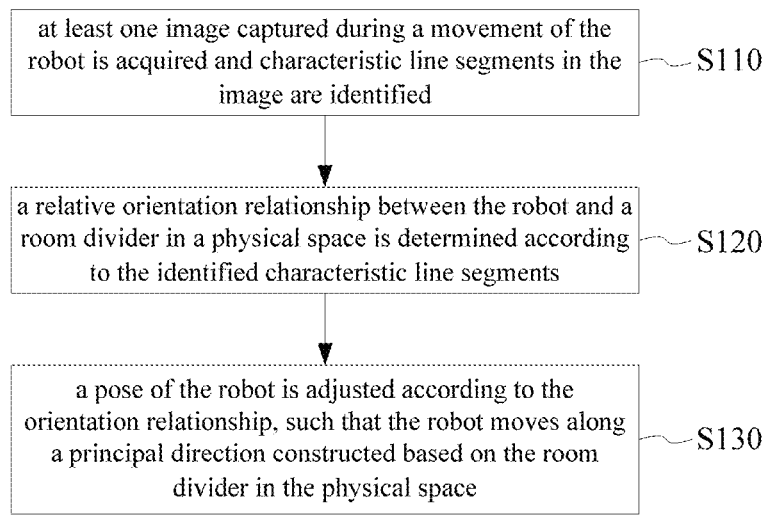
FIG. 1 shows a flowchart of a control method of a robot in the present application in one embodiment.

Implementations of the present application will be described below through specific embodiments, and those skilled in the art can easily understand other advantages and effects of the present application from the contents disclosed in the present specification.

In the following description, several embodiments of this application are described combined with the drawings. However, it should be understood that other embodiments may be available, and any changes in mechanical composition, structure, electrical and operation may be made without departing from the spirit and scope of the application. The following detailed description is not to be considered as limited, and the scope of the embodiments of the present invention is defined by the appended claims. The terminology used herein is only for describing particular embodiments, spatial-related terms such as "up", "down", "left", "right", "below", "top", "above", "bottom", etc., may be used in the text for illustrating the relationship of one element or feature to another element or feature.

Moreover, as used herein, such single forms as "one", "a" and "the" aim at also including the plural forms, unless contrarily indicted in the text. It should be further understood that, such terms as "comprise" and "include" indicate the existence of the features, steps, operations, elements, components, items, types and/or groups, but do not exclude the existence, emergence or addition of one or more other features, steps, operations, elements, components, items, types and/or groups. The terms "or" and "and/or" used herein are explained to be inclusive, or indicate any one or any combination. Therefore, "A, B or C" or "A, B and/or C" indicates "any of the following: A; B; C; A and B; A and C; B and C; A, B and C". Exceptions of the definition only exist when the combinations of elements, functions, steps or operations are mutually exclusive inherently in some ways.

The robot performs movement operations based on a navigation control technology. With a cleaning robot as an example, generally, in a room where the cleaning robot is operated, two principal directions which are vertical to each other in the room correspond to two directions formed by the wall. In order to traverse the whole region to be cleaned, the cleaning robot moves in a preset route such as Zigzag cleaning path. If the cleaning robot moves along a direction constructed based on a room divider, or moves towards a direction constructed based on a room divider, or moves away from a direction constructed based on a room divider, cleaning operations can be completed in an efficient manner, wherein, the room divider such as a wall, a window or a screen. This is because when the cleaning robot moves along the above direction, the cleaning robot can cover the region to be cleaned as far as possible during the operations, so that regions for additional cleaning can be reduced, and the cleaning efficiency can be improved.

For mobile robots used in other application scenarios which being analogized based on the example of the above-mentioned cleaning robot, in order to improve the movement coverage rate of the mobile robot, and to improve the operating efficiency of performing corresponding operations during movement, the present application provides a method for controlling a robot. Through this control method, a relative orientation between the robot and a room divider such as a wall or a window can be determined based on characteristic line segments in at least one image acquired by the robot, such that the robot can adjust its pose based on the relative orientation, and then can move along a principal direction such as a direction in parallel with the wall or vertical to the wall, so as the movement coverage rate can be improved.

Please refer to FIG. 1 which is a flowchart of a control method of a robot in the present application in one embodiment. Wherein, the control method can be performed by a control device. Wherein, the control device is arranged in the robot, and the robot further includes an image acquisition device which is in data connection with the control device and is configured to capture images. In one embodiment, the control device can preset a time interval at which an image acquisition device captures images, and then the control device acquires static images at different time captured by the image acquisition device at a preset time interval, and performs the following steps S110 to S130. In another embodiment, the image acquisition device can capture videos, since video is composed of image frames, therefore, the control device can firstly continuously or discontinuously collect the image frames in the acquired video, and then the control device selects one frame of image to serve as an image and performs steps S110 to S130.

In step S110, at least one image captured during a movement of the robot is acquired and characteristic line segments in the image are identified.

Herein, the control device of the robot acquires at least one image captured by the image acquisition device during the movement of the robot, and then performs image processing technology so as to identify the characteristic line segments in the image. Wherein, the characteristic line segments are straight line segments.

In some embodiments, the control device can identify characteristic line segments in the image in the following ways: firstly, a contour feature of an object is extracted from the acquired image. Wherein, the contour feature can be extracted through a contour line extraction method, the contour line extraction method includes but is not limited to a binary method, a grayscale method, a canny operator method, etc. And then, characteristic line segments are extracted from the extracted contour feature. Wherein, characteristic line segments can be extracted through Hough transformation. Wherein, the characteristic line segments include but are not limited to the following characteristics: straightness characteristic and/or length characteristic. For example, when the straightness of a line between adjacent characteristic points identified in the image is greater than a preset straightness threshold, and/or the length of a line between adjacent characteristic points identified in the image is greater than a preset length threshold, it can be determined that the line between the characteristic points is a characteristic line segment. In one example, the control device intercepts multiple discontinuous straight lines based on the contour line of object and the discontinuous straight lines are served as characteristic line segments so that the control device can perform subsequent processing. In another example, the control device sections the contour feature extracted based on a contour line of object, and then extracts characteristic line segments from the sectioned contour features, in this way, more characteristic line segments can be reserved.

Figure 2:
FIG. 2 shows a schematic diagram of an image acquired by an image acquisition device.
Figure 3:
FIG. 3 shows a schematic diagram of contour features identified based on the image in FIG. 2.

It should be noted that, the object contour should be understood in its broad sense, and it includes but is not limited to the contour of object placed in a room, and further includes border lines between two walls, between a wall and a roof, and between a wall and a door or a window in a room. Please refer to FIG. 2 and FIG. 3, wherein, FIG. 2 shows a schematic diagram of an image acquired by an image acquisition device, and FIG. 3 shows a schematic diagram of contour features identified based on the image in FIG. 2. As shown in FIG. 3, wherein, the thin lines indicate contour features, and the contour features are extracted from the image through the method such as a binary method, a grayscale method, or a canny operator method; the thick lines indicate characteristic line segments. Herein, when the straightness of a line between adjacent characteristic points identified in the image is greater than a preset straightness threshold, and/or the length of a line between adjacent characteristic points identified in the image is greater than a preset length threshold, it can be determined that the line between the characteristic points is a characteristic line segment.

It should also be noted that, the control device can identify characteristic line segments through a neural network algorithm. Herein, the ways of identifying characteristic line segments are not limited.

In step S120, a relative orientation relationship between the robot and a room divider in a physical space is determined according to the identified characteristic line segments.

Wherein, the room divider is a facade used for dividing a space in an application scenario of the robot. With a cleaning robot as an example, when the cleaning robot is in an indoor scenario, the room divider is a facade used for dividing an indoor space, such as a wall, a partition wall, a french window, a ceiling, etc. Therefore, for example, the relative orientation relationship between the robot and the room divider in a physical space can be represented as a relative orientation relationship between the travelling direction of the robot and the direction formed by the wall. In some embodiments, the orientation relationship between the robot and the room divider can be characterized by an angle between the travelling direction of the robot and a plane defined by the room divider. For example, the angle reflects that the travelling direction of the robot is in parallel with the wall, perpendicular to the wall or not perpendicular to the wall.

Based on the identified characteristic line segments, the control device determines the orientation relationship between the robot and the wall, including determining that the robot moves towards (or away from) the wall, the robot moves along the wall, or the robot moves along a direction that an angle between the robot and the wall is 0° to 90°. It should be noted that, in the present application, the meaning of moving towards (or away from) the wall includes moving along a direction which is perpendicular to the wall and towards (or away from) the wall. This is because for maximizing space utilizing, indoor objects are generally placed according to a principal direction constructed based on the room divider, for example, objects which do not move frequently such as desks, beds, wardrobes and shoe cabinets are generally placed according to a principal direction constructed based on the room divider, which makes the placement characteristic in the actual physical space can be reflected by images. Therefore, according to the position characteristics shown by the indoor objects and the room dividers, the control device analyzes the identified characteristic line segments to obtain the relative orientation relationship between the robot and the room divider in the physical space.

In step S130, a pose of the robot is adjusted according to the orientation relationship, such that the robot moves along a principal direction constructed based on the room divider in the physical space.

Herein, the step of adjusting the pose of the robot is to adjust an angle between the robot and the principal direction constructed based on the room divider. The adjustment for the pose of the robot can be finished when the robot is determined to move along, towards or away from the principal direction constructed based on the room divider according to the orientation relationship. It should be noted that, the meaning of moving towards (or away from) the principal direction includes moving along a direction which is perpendicular to the principal direction and towards (or away from) the principal direction.

In some embodiments, the control device controls the robot to rotate with an angle according to angles of the identified characteristic line segments in the actual physical space and the current pose of the robot, so that the robot can be in parallel with or vertical to the room divider. In other embodiments, the robot can be adjusted to rotate continuously based on a preset angle and direction, and repeat the above steps S110-S130 during rotation until the identified characteristic line segments satisfy a preset condition, that is, the robot is approximately in parallel with or vertical to the room divider. Wherein, the preset condition is set based on an orientation relationship between the robot and the principal direction which is reflected by characteristic line segments.

The robot moves along a direction which is approximately in parallel with or vertical to the room divider. For example, after determining that the cleaning robot is towards (facing) a wall, the control device controls the cleaning robot to move to the wall and then moves in a Zigzag cleaning path.

As to the control method of the robot in the present application, through the technical solution that acquiring characteristic line segments in the image and determining the orientation relationship between the robot and the room divider, the robot can adjust its pose according to the orientation relationship so as to move along the principal direction constructed based on the room divider, therefore, the movement coverage rate of robot can be improved.

Based on the above technical idea and in combination with an angle between the image acquisition device and the robot i.e., a position relationship between the image acquisition device and the robot, the control device can determine the relative orientation relationship between the robot and the room divider in the physical space and adjust a pose of the robot in a way related to the angle between the image acquisition device and the robot.

Figure 4:
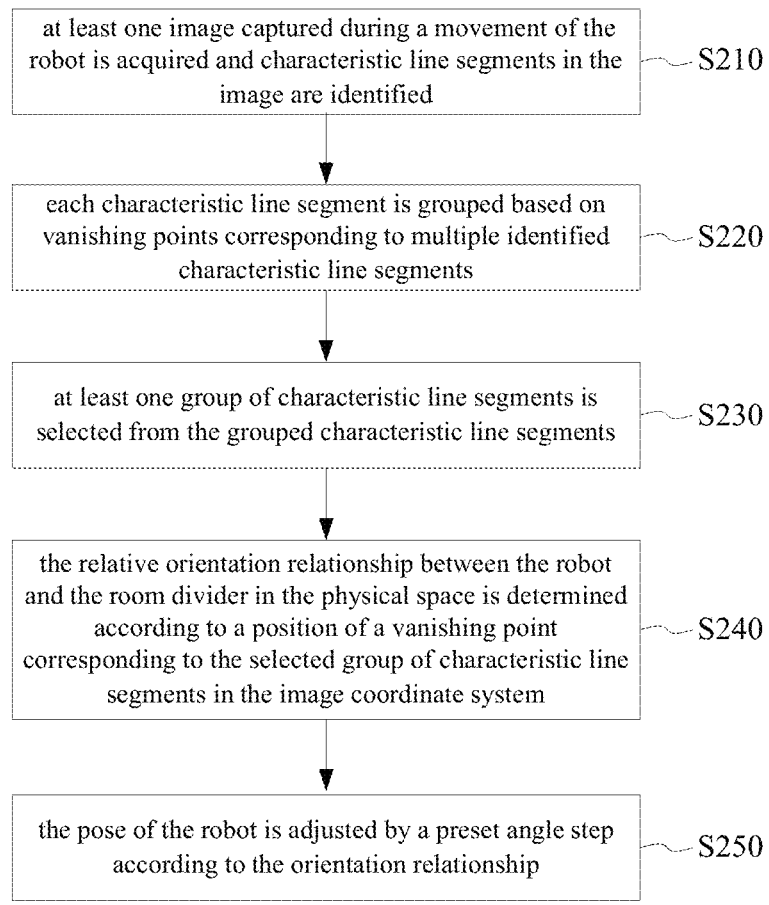
FIG. 4 shows a flowchart of a control method of the present application in another embodiment.

In some embodiments, when the image acquisition device is arranged at the side of the robot, namely, the angle between an optic axis of the image acquisition device and the plane over which the robot moves is between 0° and 90°, please refer to FIG. 4 which is a flowchart of a control method of the present application in another embodiment. As shown in the figure, the control method includes steps S210-S250.

In step S210, at least one image captured during a movement of the robot is acquired and characteristic line segments in the image are identified. Wherein, step S210 is the same as or similar to the above step S110, and will not be described in detail herein.

In step S220, each characteristic line segment is grouped based on vanishing points corresponding to multiple identified characteristic line segments.

Herein, in the case of the angle between the optic axis of the image acquisition device and the principal direction is 0° to 90°, parallel lines in the captured image have a linear characteristic named vanishing point. Wherein, the vanishing point means a point at which two or more lines representing parallel lines extend to the Horizontal Line until being converged. In the field of computer vision, straight lines with a common vanishing point in the image correspond to parallel lines in the space, that is to say, from the visual image perspective, the parallel lines in the space correspond to intersecting lines in the image, and these intersecting lines indicate multiple groups of parallel lines in the space when a common vanishing point exists among the intersection lines.

The control device can obtain each vanishing point corresponding to each characteristic line segment through performing an extending processing on each identified characteristic line segment in the image coordinate system for the image. For example, the control device calculates an intersecting point between two arbitrary characteristic line segments by utilizing an angle of inclination of each characteristic line segment in the image coordinate system, and performs a clustering processing on each intersecting point to classify the intersecting points which are adjacent to each other as one vanishing point.

In the multiple identified characteristic line segments, the number of the obtained vanishing points is always more than one, in view of this, in the present application, based on different coordinate positions of vanishing points corresponding to multiple identified characteristic line segments in the image coordinate system, the characteristic line segments which intersect at the same vanishing point are classified into one group.

In step S230, at least one group of characteristic line segments is selected from the grouped characteristic line segments.

Since most objects in the room are placed according to a principal direction constructed based on a room divider, therefore, the number of characteristic line segments in each group in the image can reflect the principal direction constructed based on the room divider. For example, the more the number of characteristic line segments corresponding to one vanishing point, the more likely the direction reflected by a group of characteristic line segments with the largest number of characteristic line segments in the physical space is the principal direction constructed based on the room divider. In view of this, in some embodiments, a group of characteristic line segments with the largest number of characteristic line segments is selected from the grouped characteristic line segments, and the group of characteristic line segments represents the principal direction constructed based on the room divider.

It should be noted that, the obtained group of characteristic line segments with the largest number of characteristic line segments is not merely one, thus, multiple groups of characteristic line segments with the largest number of characteristic line segments can be selected or one group of characteristic line segments with the largest number of characteristic line segments can be selected randomly, and then step S240 can be performed.

In step S240, the relative orientation relationship between the robot and the room divider in the physical space is determined according to a position of a vanishing point corresponding to the selected group of characteristic line segments in the image coordinate system.

Wherein, the selected group of characteristic line segments represents the principal direction constructed based on the room divider. For example, the selected group of characteristic line segments represent a contour line of an object which is arranged along a direction in parallel with or vertical to a wall or a border line of the room.

Herein, in the case of the orientation relationship, in the physical space, between the robot and a room divider A to which the robot will be faced is an angle relationship, multiple straight lines in parallel with the room divider A are the characteristic line segments having the same vanishing point when reflecting in the image. According to the angle relationship (for example, the robot will be towards the room divider A after rotating with an angle in a counter-clockwise, or the robot will be towards the room divider A after rotating with an angle in a clockwise), the corresponding vanishing point will be located in a quadrant of an image coordinate system or located in a region in which the distance between the vanishing point and a preset central point is equal to or smaller than a preset distance threshold. Based on the above orientation relationship and a corresponding relationship of the position of the vanishing point in the image coordinate system, the control device determines the relative orientation relationship between the robot and the room divider A in the physical space through analyzing the position of the vanishing point in the image coordinate system. For example, in an image coordinate system which is constructed based on a plane vertical to an optic axis of the image acquisition device, wherein, the point at which the optic axis intersects with the plane is an origin of the coordinate, if the vanishing point corresponding to the selected group of characteristic line segments is located at a left side of the coordinate system, the orientation relationship between the robot and the room divider A to which the robot will be faced is that the robot could rotate with an angle in a counter-clockwise so as to face the room divider A. Wherein, the orientation relationship represents a rough relationship, and the accurate value of deflection angle between the robot and the room divided A cannot be determined.

In step S250, the pose of the robot is adjusted by a preset angle step according to the orientation relationship.

Herein, the control device gradually adjusts the pose of the robot with a preset angle step as an unit angle according to the obtained orientation relationship.

When the robot is controlled to rotate with an unit angle, the robot acquires the image captured by the image acquisition device, and performs the above steps S210 to S250 repeatedly until determining that the robot is approximately in parallel with or vertical to the room divider, that is, determining that the preset condition which is used to determining whether the robot moves along a principal direction constructed based on the room divider is satisfied. Wherein, when the robot moves towards or away from the room divider, or when the robot moves along the room divider, the selected group of characteristic line segments is regarded as a mapping of the straight lines in parallel with or vertical to the room divider in the image. The preset condition can be set in advance based on the position coordinates of the vanishing point corresponding to the selected group of characteristic line segments in the image coordinate system, and some condition parameters used for evaluating degree of parallelism of the selected group of characteristic line segments can also be set.

In some embodiments, the step of determining whether the robot moves along a principal direction constructed based on the room divider includes: determining whether the characteristic line segments identified from the current image satisfy a preset parallel condition, if so, determining that the pose of the robot is consistent with the principal direction constructed based on the room divider, otherwise, adjusting the pose of the robot continuously and repeating the above each step until the parallel condition is satisfied. Wherein, the meaning that the pose of the robot is consistent with the principal direction constructed based on the room divider includes: the current pose of the robot is that the robot is facing (towards) the room divider, the robot turns its back to (away from) the room divider or the robot is along the room divider. Wherein, the meaning that the robot is facing the room divider indicates that the travelling direction of the robot is perpendicular to the room divider and the travelling direction of the robot is directed to the room divider; the meaning that the robot turns its back to the room divider indicates that the travelling direction of the robot is perpendicular to the room divider and the travelling direction of the robot is away from the room divider; the meaning that the robot is along the room divider indicates that the travelling direction of the robot is in parallel with the room divider.

In some examples, when the group of characteristic line segments selected by the control device satisfies the parallel condition, the control device determines that the current pose of the robot is that the robot is towards the room divider. Wherein, in a specific example, the parallel condition includes: a distance error between two characteristic line segments which are not on the same straight line in the selected group of characteristic line segments is smaller than or equal to a preset distance error threshold. For example, the control device calculates the vertial distance between any two arbitrary characteristic line segments in the selected group of characteristic line segments, if the calculated vertical distance is smaller than the distance error threshold, the selected two characteristic line segments are determined to be in parallel with each other, that is, the robot is determined to be towards the room divider in the physical space, otherwise, the pose of the robot is adjusted continuously. In another specific example, the parallel condition includes the position of a vanishing point corresponding to the selected group of characteristic line segments falls within a preset region. For example, the control device calculates whether the coordinate of the vanishing point corresponding to the selected group of characteristic line segments falls within a preset region in the image coordinate system, wherein, the region is used for defining that the current pose of the robot is approximately vertical to the room divider. If so, the selected characteristic line segments are determined to be in parallel with each other, that is, the robot is determined to be towards the room divider in the physical space, otherwise, the pose of the robot is adjusted continuously.

When the robot is determined to move along the principal direction constructed based on the room divider, the manner of controlling the robot to move along the principal direction constructed along the room divider such as a wall can include that controlling the robot to move in parallel with the wall, controlling the robot to move towards the wall, and controlling the robot to move away from the wall.

Figure 5:
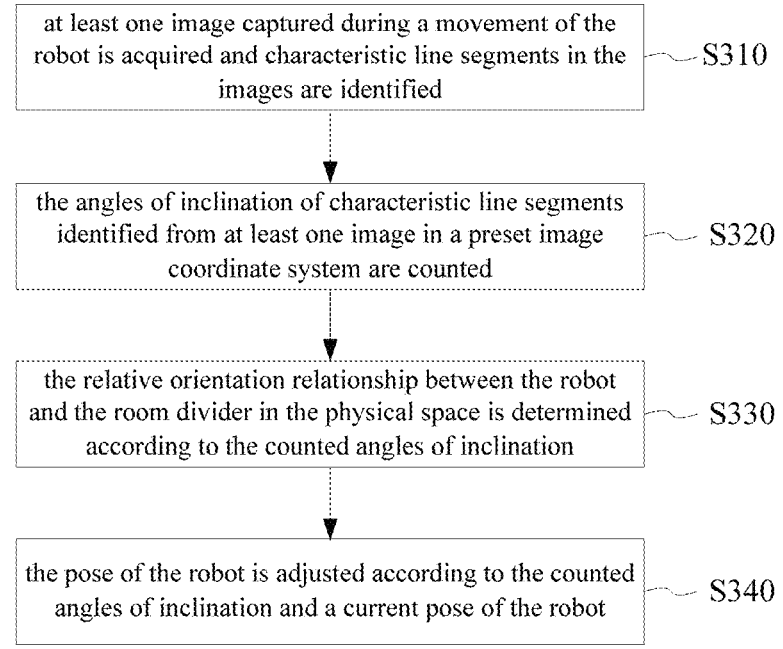
FIG. 5 shows a flowchart of a control method of the present application in yet another embodiment.

In some other embodiments, the image acquisition device is arranged at the top of the robot and the optic axis of the image acquisition device is vertical to the plane over which the robot moves, please refer to FIG. 5 which shows a flowchart of a control method of the present application in still another embodiment. As shown in the figure, the control method includes steps S310-S340.

In step S310, at least one image captured during a movement of the robot is acquired and characteristic line segments in the images are identified. Wherein, step S310 is the same as or similar to the above step S110, and will not be described in detail herein.

In step S320, the angles of inclination of characteristic line segments identified from at least one image in a preset image coordinate system are counted.

Herein, since the placement of each object in the room and the room structure are both based on the principle direction constructed based on a room divider, and according to the characteristic that the principal directions constructed based on a room divider are intersecting with each other, the image captured by the image acquisition device have characteristic line segments which are intersecting with each other, wherein, the image acquisition device is arranged on the top of the robot and the optic axis thereof is vertical to the plane over which the robot moves. Therefore, the characteristic line segments which are intersecting with each other and the angles of inclination thereof can be found out conveniently through counting the angle of inclination of each characteristic line segment in the image coordinate system.

In some embodiments, the angles of inclination of characteristic line segments in one image in the preset image coordinate system are counted. For example, an image coordinate system UOV is preset, wherein, the intersection point between the optic axis of the image acquisition device and the imaging plane is taken as an origin O of the image coordinate system, and two directions which are orthogonal with each other and set based on the room divider are taken as a U axis and a V axis of the image coordinate system, respectively, for example, the direction formed by the room divider can be taken as U axis, and the orthogonal dirction thereof can be taken as V axis. With regard to the characteristic line segments identified in the image, corresponding coordinates of the characteristic line segments in the image coordinate system UOV can be obtained, as well as the angle of inclination of each characteristic line segment in the image coordinate system UOV can be obtained, and then the obtained angles of inclination are counted to obtain a statistical results, and the statistical results represent the angular distribution of characteristic line segments. Wherein, the angles of inclination are in a range of 0° to 180°. In one example, the statistical results can be shown in the manner of a waveform diagram or a histogram. For example, in the case that the statistical results are shown in a waveform diagram, suppose that X axis represents the values of inclination angles of characteristic line segments in the images in the image coordinate system UOV, and Y axis represents the number of characteristic line segments corresponding to each value of inclination angle, and the statistical results are drawn.

In some other embodiments, in order to improve accuracy in counting the angles of inclination, the control device counts the angles of inclination of characteristic line segments in multiple images in the preset image coordinate system.

Herein, in order to avoid the change of angle of inclination of each characteristic line segment in the image coordinate system due to the pose change of the robot, the control device acquires a change of the pose of robot corresponding to the captured adjacent images during the movement of the robot. Since the image coordinate system is in parallel with the plane over which the robot moving, the detected pose change can be used for a regression compensation on the angles of inclination of the characteristic line segments in the corresponding images. Therefore, step S320 includes within a time period of the pose adjustment, a regression process is performed on an angle of inclination of each characteristic line segment in the acquired at least two images based on a rotating angle at which the robot moves when capturing the at least two images; and the regression processed angle of inclination of each characteristic line segment in the preset image coordinate system is counted.

Wherein, the step of performing the regression process includes: taking one of the images captured by the robot as a reference image, and the pose (position and angle) of the robot at which the reference image is captured as a reference pose, performing a correction on the angles of inclination of the characteristic line segments in other images. With counting the angles of inclination of characteristic line segments in two images as an example, the robot captures a first image and counts the angles of inclination of characteristic line segments in the first image so as to obtain first statistical results, and after adjusting its pose, the robot captures a second image and counts the angles of inclination of characteristic line segments in the second image so as to obtain second statistical results. Based on this, taking the pose at which the robot captures the first image as the reference pose, based on the pose at which the robot captures the second image, the rotating angle of the current pose of the robot relative to the reference pose can be obtained through such manners as a gyroscope or VSLAM. And then, the obtained rotating angle is mapped onto the image coordinate system so as to obtain a rotating angle of the second image relative to the first image, based on the rotating angle, the angles of inclination of the characteristic line segments contained in the second statistical results are corrected, such that characteristic line segments in the second image and the characteristic line segments in the first image can be in a same coordinate system, thereby deviation of the inclination angle brought by the rotation of the robot can be eliminated. Finally, the first statistical results and the regression processed second statistical results are as a whole and a statistics is performed on the whole data, so as to obtain a final statistical result of the angle of inclination of each characteristic line segment in the image coordinate system.

In step S330, the relative orientation relationship between the robot and the room divider in the physical space is determined according to the counted angles of inclination.

After the control device counts the characteristic line segments in at least one image, the control device can obtain at least one peak interval in the statistical results, and the angles of inclination corresponding to the obtained peak interval can represent the relative orientation relationship between the robot and the room divider in the physical space. Herein, a peak interval can be obtained based on the statistical results, the peak interval represents that the number of characteristic line segments corresponding to angles of inclination within the peak interval is the largest, while the largest number of characteristic line segments represents that the direction indicated by these characteristic line segments is the principal direction constructed based on the room divider. Therefore, in some embodiments, the relative orientation relationship between the robot and the room divider in the physical space can be determined according to the counted angles of inclination within the peak interval. Herein, the orientation relationship includes a deflection angle interval and a rotating direction of the robot relative to a to-be-faced room divider. For example, if the counted peak interval is 41°±1° from the U axis ray according to the preset image coordinate system, the control device determines that the deflection angle interval between the robot and the room divider indicated by the U axis is 41°±1°. It should be noted that the above angle and direction are only examples, and the present application is not limited as these.

It should be noted that, based on an image identification error and a counting error, the angle of inclination within the peak interval can be an interval in which the angles of inclination within a error range. Based on this, in one example, an average angle of inclination in the interval is used as an angle of inclination which characterizes the orientation relationship.

Figure 6:
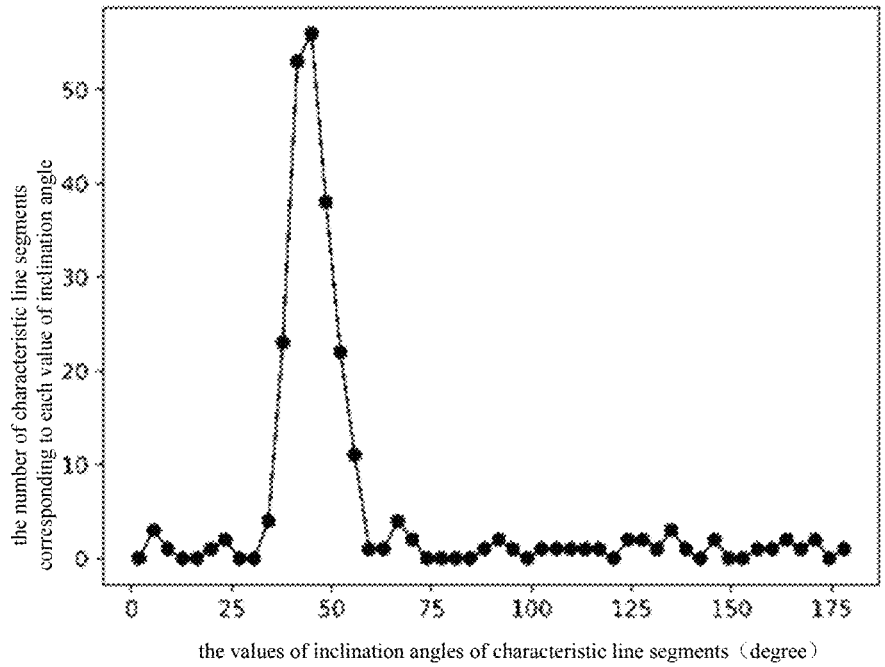
FIG. 6 shows a waveform diagram of the statistical results for the characteristic line segments and the angles of inclination of the present application in one embodiment.

Please refer to FIG. 6 which shows a waveform diagram of the statistical results for the characteristic line segments and the angles of inclination of the present application in one embodiment. As shown in the figure, X axis represents angles of inclination of characteristic line segments in the image, Y axis represents the number of characteristic line segments. FIG. 6 shows that there is one maximum peak interval in the waveform diagram, and the characteristic line segments corresponding to the angle of inclination in the peak interval represents the principal direction constructed based on the room divider, for example, the principal direction can be the direction in parallel with the wall or the direction vertical to the wall. Thus, the relative orientation relationship between the robot and the room divider in the physical space can be characterized by the angle between the robot and the room divider, namely, the angle of inclination in the peak interval. For example, suppose that the angle of inclination in the peak interval is 45°, namely, the angle between the travelling direction of the robot and the wall is 45°.

Figure 7:
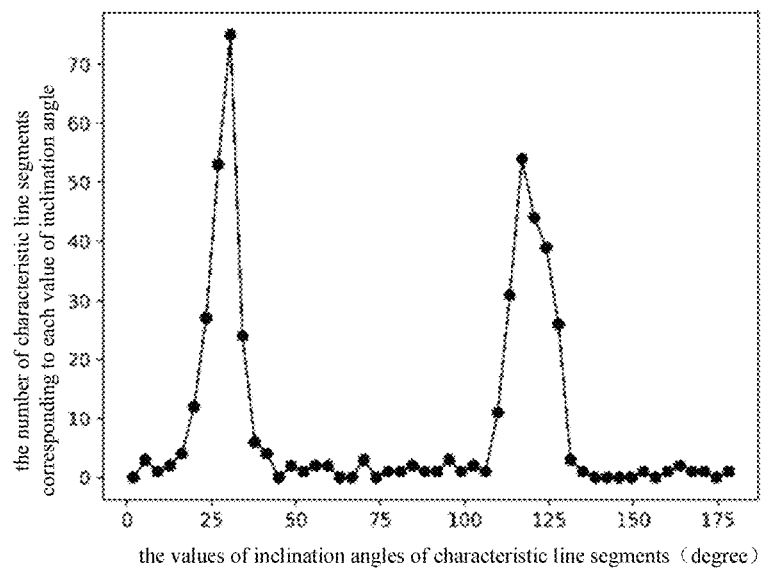
FIG. 7 shows a waveform diagram of the statistical results for the characteristic line segments and the angles of inclination of the present application in another embodiment.

Please refer to FIG. 7 which shows a waveform diagram of the statistical results for the characteristic line segments and the angles of inclination of the present application in another embodiment. As shown in the figure, X axis represents an angle of inclination of characteristic line segments in the image, Y axis represents the number of characteristic line segments. FIG. 7 shows that there are two maximum peak intervals in the waveform diagram. Theoretically, the two angles of inclination in the two peak intervals should form an angle of 90°, and the characteristic line segments corresponding to said two angles of inclination represent a direction in parallel with the wall and a direction vertical to the wall, respectively. Therefore, on the one hand, the relative orientation relationship between the robot and the room divider in the physical space can be characterized by an angle between the robot and the room divider, namely, the angle of inclination in any peak interval, on the other hand, whether the obtained characteristic line segments corresponding to the two peak intervals respectively characterize the direction in parallel with the wall and the direction vertical to the wall can be verified through judging whether the difference between two angles of inclination in two peak intervals falls within a scope of "90°±σ" (wherein, σ represents an error). For example, suppose that an angle of inclination in one peak interval is 30°, the other angle in another peak value should be 120°±δ, which indicates the angle between the travelling direction of the robot and the wall is 30° or 120°±σ.

In step S340, the pose of the robot is adjusted according to the counted angles of inclination and a current pose of the robot.

Herein, based on the angles of inclination obtained through counting and the current pose of the robot, the control device controls the robot to rotate according to corresponding angle of inclination and rotating direction, such that the travelling direction of the robot is in parallel with or vertical to the room divider, and further, the control device controls the robot to move towards or away from the room divider along the above principal direction.

According to the manners of adjusting the pose of the robot in the above examples, the control device further performs a step of planning a navigation route based on the current position of the robot when determining that the robot moves along the principal direction constructed based on the room divider in the physical space.

Wherein, the navigation route can include: a first route along which the robot moves towards the room divider, and a second route along which the robot traverses a preset region from an end point of the first route. Wherein, the preset region can be for example a cleaning region of a cleaning robot, or a patrol region of a patrol robot.

With a cleaning robot as an example, a principal direction constructed based on a room divider can be a first wall and a second wall which are vertical to each other, when determining that the cleaning robot moves along the principal direction constructed based on the room divider, the cleaning robot is set to move along the principal direction until the cleasning robot contacts with the room divider, for example, the cleaning robot is set to move towards or away from the first wall, until the cleaning robot contacts with the first wall or contacts with another wall which is in parallel with the first wall, or, the cleaning robot is set to move along the first wall, until the cleaning robot contacts with the second wall which is vertical to the first wall. And then, with the current position of the cleaning robot as a starting point, the cleaning robot is planned to move in the cleaning region in Zigzag cleaning path, such that the cleaning robot can cover the cleaning region as fully as possible during operation, thereby the cleaning efficiency can be improved.

Figure 8:
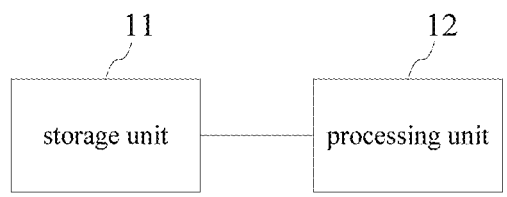
FIG. 8 shows a structural schematic diagram of a control device of a robot in the present application in one embodiment.

The present application further provides a control device of a robot. Please refer to FIG. 8 which shows a structural schematic diagram of a control device of the robot in the present application in one embodiment. As shown in the figure, the control device of the robot includes a storage unit 11 and a processing unit 12.

The storage unit 11 is configured to store images captured by the image acquisition device and at least one program. The storage unit 11 can include a high speed random access memory and can also include a non-volatile memory, for example, one or more disk storage devices, flash memory devices or other non-volatile solid state storage devices. The storage unit 11 further includes a storage controller which can control the access of other assemblies of the device such as a CPU and a peripheral interface to the storage. The programs stored in the storage unit 11 include related programs which are described later and which are invoked by a processing unit to perform the control method.

The processing unit 12 is operably coupled to the storage unit. In addition, the processing unit is also operably coupled to a power supply, and the power supply can provide power for various parts in a control mainboard. In this way, the power supply can include any appropriate energy, for example, a rechargeable Li-polymer (Li-poly) battery and/or an alternating current (AC) power converter.

The processing unit 12 is configured to invoke at least one program and perform any of the above control method. Wherein, the processing unit 12 is in data communication with the storage unit 11. The processing unit 12 can execute the instructions stored in the storage unit so as to perform operations in the robot. Specific implementations in which the processing unit performs the control method are as shown in FIG. 1 to FIG. 7 and related descriptions, and will not be described in detail herein.

Figure 9:
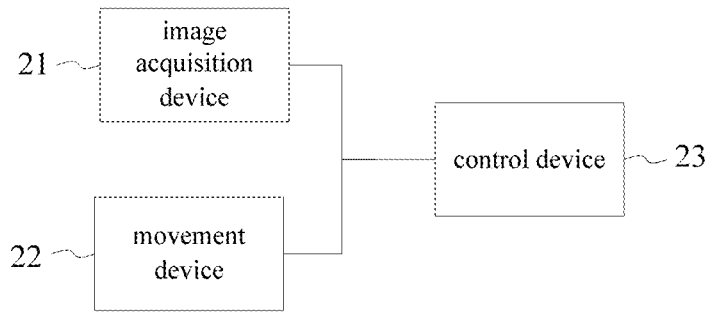
FIG. 9 shows a structural schematic diagram of a robot of the present application in one embodiment.

The present application further provides a robot. The robot includes but is not limited to a cleaning robot, a patrol robot and a robot used to accompany family members. The robot performs the above control method. Please refer to FIG. 9 which shows a structural schematic diagram of a robot in the present application in one embodiment. As shown in the figure, the robot includes an image acquisition device 21, a movement device 22 and a control device 23.

The image acquisition device 21 is configured to capture images during the movement of the robot. In one embodiment, the control device can preset a time interval at which an image acquisition device captures images, and then the control device acquires static images at different time captured by the image acquisition device at a preset time interval. In another embodiment, the image acquisition device can capture videos, since video is composed of image frames, therefore, the control device can firstly continuously or discontinuously collect the image frames in the acquired video, and then the control device selects one frame of image to serve as an image. The image acquisition device includes but is not limited to a camera, a video camera, an image acquisition module integrated with an optical system or a CCD chip, and an image acquisition module integrated with an optical system and a CMOS chip. A power supply system of the image acquisition device can be controlled by a power supply system of the mobile robot, and the image acquisition device captures images on the route along which the mobile robot moves.

The movement device 22 is configured to adjust the pose of the robot according to the received control instruction. Wherein, the movement device 22 adjusts the movement distance, the movement direction, the movement speed, and movement acceleration and so on under the control of the control device 23.

In some embodiments, the movement device 22 includes a drive unit and at least two sets of rolling wheels. Wherein at least one set of rolling wheels in at least two sets of rolling wheels is a controlled set of rolling wheels. The drive unit is connected with the processing device, and the drive unit is configured to drive the controlled set of rolling wheels to roll based on the movement control instruction output by the processing device.

The drive unit includes a drive motor, and the drive motor is connected with the sets of rolling wheels to directly drive the sets of rolling wheels to roll. The drive unit can include one or more central processing units (CPU) or micro processing units (MCU) dedicated to the control of the drive motor. For example, the micro processing unit is configured to convert the information or data provided by the processing device into electric signals which control the drive motor, and control the rotating speed and steering of the mobile robot according to the electric signals, so as to adjust the movement speed and movement direction of the mobile robot. The information or data can be a deflection angle determined by the processing device. The processor in the drive unit can be shared with the processor in the processing device or can be arranged independently. For example, the drive unit is used as a slave processing device, the processing device is used as a primary device, and the drive unit performs movement control based on the control of the processing device. Or the drive unit is shared with the processor in the processing device. The drive unit receives data provided by the processing device through a program interface. The drive unit is configured to control the set of controlled rolling wheels to roll based on the movement control instructions provided by the processing device.

The control device 23 can be in data communication with the image acquisition device 21 and the movement device 22. The control device 23 can include one or more processors. The processor can include one or more general-purpose microprocessors, one or more application specific integrated circuits (ASIC), one or more digital signal processors (DSP), one or more field programmable gate arrays (FPGA) or any combination thereof. The control device is also operably coupled to an I/O port and an input structure, wherein, the robot can interact with various other electronic apparatus by the I/O port, and the user can interact with a computing apparatus by the input structure. Therefore, the input structure can include a button, a keyboard, a mouse, a touchpad and the like. The other electronic apparatus can be a mobile motor in the movement device of the robot, or a slave processor dedicated to the control of the movement device in the robot, for example, a microcontroller unit (MCU).

In an example, the control device is connected with the image acquisition device and the movement device respectively through data cables. The control device interacts with the image acquisition device and the movement device through an interface protocol. The processing device interacts with the storage device through a data read-write technology. Wherein, the data read-write technology includes but is not limited to a high-speed/low-speed data interface protocol, a database read-write operation and the like. The interface protocol includes but is not limited to an HDMI interface protocol, a serial interface protocol and the like.

The control device 23 acquires at least one image captured by the image acquisition device 21 and identifies the characteristic line segments in the image.

Herein, the control device of the robot acquires at least one image captured by the image acquisition device during the movement of the robot, and then performs image processing technology so as to identify the characteristic line segments in the image. Wherein, the characteristic line segments are straight line segments.

In some embodiments, the control device can identify characteristic line segments in the image in the following ways: firstly, a contour feature of an object is extracted from the acquired image. Wherein, the contour feature can be extracted through a contour line extraction method, the contour line extraction method includes but is not limited to a binary method, a grayscale method, a canny operator method, etc. And then, characteristic line segments are extracted from the extracted contour feature. Wherein, characteristic line segments can be extracted through Hough transformation. Wherein, the characteristic line segments include but are not limited to the following characteristics: straightness characteristic and/or length characteristic. For example, when the straightness of a line between adjacent characteristic points identified in the image is greater than a preset straightness threshold, and/or the length of a line between adjacent characteristic points identified in the image is greater than a preset length threshold, it can be determined that the line between the characteristic points is a characteristic line segment. In one example, the control device intercepts multiple discontinuous straight lines based on the contour line of object and the discontinuous straight lines are served as characteristic line segments so that the control device can perform subsequent processing. In another example, the control device sections the contour feature extracted based on a contour line of object, and then extracts characteristic line segments from the sectioned contour features, in this way, more characteristic line segments can be reserved.

It should be noted that, the object contour should be understood in its broad sense, and it includes but is not limited to the contour of object placed in a room, and further includes border lines between two walls, between a wall and a roof, and between a wall and a door or a window in a room. Please refer to FIG. 2 and FIG. 3, wherein, FIG. 2 shows a schematic diagram of an image acquired by an image acquisition device, and FIG. 3 shows a schematic diagram of contour features identified based on the image in FIG. 2.

It should also be noted that, the control device can identify characteristic line segments through a neural network algorithm. Herein, the ways of identifying characteristic line segments are not limited.

Next, the control device determine a relative orientation relationship between the robot and a room divider in a physical space according to the identified characteristic line segments.

Wherein, the room divider is a facade used for dividing a space in an application scenario of the robot. With a cleaning robot as an example, when the cleaning robot is in an indoor scenario, the room divider is a facade used for dividing an indoor space, such as a wall, a partition wall, a french window, a ceiling, etc. Therefore, for example, the relative orientation relationship between the robot and the room divider in a physical space can be represented as a relative orientation relationship between the travelling direction of the robot and the direction formed by the wall. In some embodiments, the orientation relationship between the robot and the room divider can be characterized by an angle between the travelling direction of the robot and a plane defined by the room divider. For example, the angle reflects that the travelling direction of the robot is in parallel with the wall, perpendicular to the wall or not perpendicular to the wall.

Based on the identified characteristic line segments, the control device determines the orientation relationship between the robot and the wall, including determining that the robot moves towards (or away from) the wall, the robot moves along the wall, or the robot moves along a direction that an angle between the robot and the wall is 0° to 90°. It should be noted that, in the present application, the meaning of moving towards (or away from) the wall includes moving along a direction which is perpendicular to the wall and towards (or away from) the wall. This is because for maximizing space utilizing, indoor objects are generally placed according to a principal direction constructed based on the room divider, for example, objects which do not move frequently such as desks, beds, wardrobes and shoe cabinets are generally placed according to a principal direction constructed based on the room divider, which makes the placement characteristic in the actual physical space can be reflected by images. Therefore, according to the position characteristics shown by the indoor objects and the room dividers, the control device analyzes the identified characteristic line segments to obtain the relative orientation relationship between the robot and the room divider in the physical space.

Next, the control device adjusts a pose of the robot according to the orientation relationship, such that the robot moves along a principal direction constructed based on the room divider in the physical space.

Herein, the step of adjusting the pose of the robot is to adjust an angle between the robot and the principal direction constructed based on the room divider. The adjustment for the pose of the robot can be finished when the robot is determined to move along, towards or away from the principal direction constructed based on the room divider according to the orientation relationship. It should be noted that, the meaning of moving towards (or away from) the principal direction includes moving along a direction which is perpendicular to the principal direction and towards (or away from) the principal direction.

In some embodiments, the control device controls the robot to rotate with an angle according to angles of the identified characteristic line segments in the actual physical space and the current pose of the robot, so that the robot can be in parallel with or vertical to the room divider. In other embodiments, the robot can be adjusted to rotate continuously based on a preset angle and direction, and repeat the above steps during rotation until the identified characteristic line segments satisfy a preset condition, that is, the robot is approximately in parallel with or vertical to the room divider. Wherein, the preset condition is set based on an orientation relationship between the robot and the principal direction which is reflected by characteristic line segments.

The robot moves along a direction which is approximately in parallel with or vertical to the room divider. For example, after determining that the cleaning robot is towards (facing) a wall, the control device controls the cleaning robot to move to the wall and then moves in a Zigzag cleaning path.

As to the robot in the present application, through the technical solution that acquiring characteristic line segments in the image and determining the orientation relationship between the robot and the room divider, the robot can adjust its pose according to the orientation relationship so as to move along the principal direction constructed based on the room divider, therefore, the movement coverage rate of robot can be improved.

Based on the above technical idea and in combination with an angle between the image acquisition device and the robot i.e., a position relationship between the image acquisition device and the robot, the control device can determine the relative orientation relationship between the robot and the room divider in the physical space and adjust a pose of the robot in a way related to the angle between the image acquisition device and the robot.

In some embodiments, when the image acquisition device 21 is arranged at the side of the robot, namely, the angle between an optic axis of the image acquisition device 21 and the plane over which the robot moves is between 0° and 90°, the image acquisition device 21 captures at least one image during a movement of the robot and provides the image to the control device 23. And then, the control device identifies characteristic line segments in the image.

Next, the control device groups each characteristic line segment based on vanishing points corresponding to multiple identified characteristic line segments.

Herein, in the case of the angle between the optic axis of the image acquisition device and the principal direction is 0° to 90°, parallel lines in the captured image have a linear characteristic named vanishing point. Wherein, the vanishing point means a point at which two or more lines representing parallel lines extend to the Horizontal Line until being converged. In the field of computer vision, straight lines with a common vanishing point in the image correspond to parallel lines in the space, that is to say, from the visual image perspective, the parallel lines in the space correspond to intersecting lines in the image, and these intersecting lines indicate multiple groups of parallel lines in the space when a common vanishing point exists among the intersection lines.

The control device can obtain each vanishing point corresponding to each characteristic line segment through performing an extending processing on each identified characteristic line segment in the image coordinate system for the image. For example, the control device calculates an intersecting point between two arbitrary characteristic line segments by utilizing an angle of inclination of each characteristic line segment in the image coordinate system, and performs a clustering processing on each intersecting point to classify the intersecting points which are adjacent to each other as one vanishing point.

In the multiple identified characteristic line segments, the number of the obtained vanishing points is always more than one, in view of this, in the present application, based on different coordinate positions of vanishing points corresponding to multiple identified characteristic line segments in the image coordinate system, the characteristic line segments which intersect at the same vanishing point are classified into one group.

Next, the control device 23 selects at least one group of characteristic line segments from the grouped characteristic line segments.

Since most objects in the room are placed according to a principal direction constructed based on a room divider, therefore, the number of characteristic line segments in each group in the image can reflect the principal direction constructed based on the room divider. For example, the more the number of characteristic line segments corresponding to one vanishing point, the more likely the direction reflected by a group of characteristic line segments with the largest number of characteristic line segments in the physical space is the principal direction constructed based on the room divider. In view of this, in some embodiments, a group of characteristic line segments with the largest number of characteristic line segments is selected from the grouped characteristic line segments, and the group of characteristic line segments represents the principal direction constructed based on the room divider.

It should be noted that, the obtained group of characteristic line segments with the largest number of characteristic line segments is not merely one, thus, multiple groups of characteristic line segments with the largest number of characteristic line segments can be selected or one group of characteristic line segments with the largest number of characteristic line segments can be selected randomly, and then step S240 can be performed.

Next, the control device 23 determines the relative orientation relationship between the robot and the room divider in the physical space according to a position of a vanishing point corresponding to the selected group of characteristic line segments in the image coordinate system.

Wherein, the selected group of characteristic line segments represents the principal direction constructed based on the room divider. For example, the selected group of characteristic line segments represent a contour line of an object which is arranged along a direction in parallel with or vertical to a wall or a border line of the room.

Herein, in the case of the orientation relationship, in the physical space, between the robot and a room divider A to which the robot will be faced is an angle relationship, multiple straight lines in parallel with the room divider A are the characteristic line segments having the same vanishing point when reflecting in the image. According to the angle relationship (for example, the robot will be towards the room divider A after rotating with an angle in a counter-clockwise, or the robot will be towards the room divider A after rotating with an angle in a clockwise), the corresponding vanishing point will be located in a quadrant of an image coordinate system or located in a region in which the distance between the vanishing point and a preset central point is equal to or smaller than a preset distance threshold. Based on the above orientation relationship and a corresponding relationship of the position of the vanishing point in the image coordinate system, the control device determines the relative orientation relationship between the robot and the room divider A in the physical space through analyzing the position of the vanishing point in the image coordinate system. For example, in an image coordinate system which is constructed based on a plane vertical to an optic axis of the image acquisition device, wherein, the point at which the optic axis intersects with the plane is an origin of the coordinate, if the vanishing point corresponding to the selected group of characteristic line segments is located at a left side of the coordinate system, the orientation relationship between the robot and the room divider A to which the robot will be faced is that the robot could rotate with an angle in a counter-clockwise so as to face the room divider A. Wherein, the orientation relationship represents a rough relationship, and the accurate value of deflection angle between the robot and the room divided A cannot be determined.

Finally, the control device 23 adjusts the pose of the robot according to the orientation relationship.

Herein, the control device 23 controls the rotating direction and the rotating angle of the movement device 22 by a preset angle step according to the orientation relationship so as to gradually adjusts the pose of the robot.

When the robot is controlled to rotate with an unit angle, the robot acquires the image captured by the image acquisition device, and performs the above steps S210 to S250 repeatedly until determining that the robot is approximately in parallel with or vertical to the room divider, that is, determing that the preset condition which is used to determing whether the robot moves along a principal direction constructed based on the room divider is satisfied. Wherein, when the robot moves towards or away from the room divider, or when the robot moves along the room divider, the selected group of characteristic line segments is regarded as a mapping of the straight lines in parallel with or vertical to the room divider in the image. The preset condition can be set in advance based on the position coordinates of the vanishing point corresponding to the selected group of characteristic line segments in the image coordinate system, and some condition parameters used for evaluating degree of parallelism of the selected group of characteristic line segments can also be set.

In some embodiments, the step of determining whether the robot moves along a principal direction constructed based on the room divider includes: determining whether the characteristic line segments identified from the current image satisfy a preset parallel condition, if so, determining that the pose of the robot is consistent with the principal direction constructed based on the room divider, otherwise, adjusting the pose of the robot continuously and repeating the above each step until the parallel condition is satisfied. Wherein, the meaning that the pose of the robot is consistent with the principal direction constructed based on the room divider includes: the current pose of the robot is that the robot is facing (towards) the room divider, the robot turns its back to (away from) the room divider or the robot is along the room divider. Wherein, the meaning that the robot is facing the room divider indicates that the travelling direction of the robot is perpendicular to the room divider and the travelling direction of the robot is directed to the room divider; the meaning that the robot turns its back to the room divider indicates that the travelling direction of the robot is perpendicular to the room divider and the travelling direction of the robot is away from the room divider; the meaning that the robot is along the room divider indicates that the travelling direction of the robot is in parallel with the room divider.

In some examples, when the group of characteristic line segments selected by the control device satisfies the parallel condition, the control device determines that the current pose of the robot is that the robot is towards the room divider. Wherein, in a specific example, the parallel condition includes: a distance error between two characteristic line segments which are not on the same straight line in the selected group of characteristic line segments is smaller than or equal to a preset distance error threshold. For example, the control device calculates the vertial distance between any two arbitrary characteristic line segments in the selected group of characteristic line segments, if the calculated vertical distance is smaller than the distance error threshold, the selected two characteristic line segments are determined to be in parallel with each other, that is, the robot is determined to be towards the room divider in the physical space, otherwise, the pose of the robot is adjusted continuously. In another specific example, the parallel condition includes the position of a vanishing point corresponding to the selected group of characteristic line segments falls within a preset region. For example, the control device calculates whether the coordinate of the vanishing point corresponding to the selected group of characteristic line segments falls within a preset region in the image coordinate system, wherein, the region is used for defining that the current pose of the robot is approximately vertical to the room divider. If so, the selected characteristic line segments are determined to be in parallel with each other, that is, the robot is determined to be towards the room divider in the physical space, otherwise, the pose of the robot is adjusted continuously.

When the robot is determined to move along the principal direction constructed based on the room divider, the manner of controlling the robot to move along the principal direction constructed along the room divider such as a wall can include that controlling the robot to move in parallel with the wall, controlling the robot to move towards the wall, and controlling the robot to move away from the wall.

In some other embodiments, the image acquisition device 21 is arranged at the top of the robot and the optic axis of the image acquisition device 21 is vertical to the plane over which the robot moves, the image acquisition device 21 captures at least one image during a movement of the robot and provides the image to the control device 23. And then, the control device identifies characteristic line segments in the image.

Next, the control device 23 counts the angles of inclination of characteristic line segments identified from at least one image in a preset image coordinate system.

Herein, since the placement of each object in the room and the room structure are both based on the principle direction constructed based on a room divider, and according to the characteristic that the principal directions constructed based on a room divider are intersecting with each other, the image captured by the image acquisition device have characteristic line segments which are intersecting with each other, wherein, the image acquisition device is arranged on the top of the robot and the optic axis thereof is vertical to the plane over which the robot moves. Therefore, the characteristic line segments which are intersecting with each other and the angles of inclination thereof can be found out conveniently through counting the angle of inclination of each characteristic line segment in the image coordinate system.

In some embodiments, the angles of inclination of characteristic line segments in one image in the preset image coordinate system are counted. For example, an image coordinate system UOV is preset, wherein, the intersection point between the optic axis of the image acquisition device and the imaging plane is taken as an origin O of the image coordinate system, and two directions which are orthogonal with each other and set based on the room divider are taken as a U axis and a V axis of the image coordinate system, respectively, for example, the direction formed by the room divider can be taken as U axis, and the orthogonal dirction thereof can be taken as V axis. With regard to the characteristic line segments identified in the image, corresponding coordinates of the characteristic line segments in the image coordinate system UOV can be obtained, as well as the angle of inclination of each characteristic line segment in the image coordinate system UOV can be obtained, and then the obtained angles of inclination are counted to obtain a statistical results, and the statistical results represent the angular distribution of characteristic line segments. Wherein, the angles of inclination are in a range of 0° to 180°. In one example, the statistical results can be shown in the manner of a waveform diagram or a histogram. For example, in the case that the statistical results are shown in a waveform diagram, suppose that X axis represents the values of inclination angles of characteristic line segments in the images in the image coordinate system UOV, and Y axis represents the number of characteristic line segments corresponding to each value of inclination angle, and the statistical results are drawn.

In some other embodiments, in order to improve accuracy in counting the angles of inclination, the control device counts the angles of inclination of characteristic line segments in multiple images in the preset image coordinate system.

Herein, in order to avoid the change of angle of inclination of each characteristic line segment in the image coordinate system due to the pose change of the robot, the control device acquires a change of the pose of robot corresponding to the captured adjacent images during the movement of the robot. Since the image coordinate system is in parallel with the plane over whcih the robot moving, the detected pose change can be used for a regression compensation on the angles of inclination of the characteristic line segments in the corresponding images. Therefore, within a time period of the pose adjustment, a regression process is performed by the robot on an angle of inclination of each characteristic line segment in the acquired at least two images based on a rotating angle at which the robot moves when capturing the at least two images; and the regression processed angle of inclination of each characteristic line segment in the preset image coordinate system is counted.

Wherein, the step of performing the regression process includes: taking one of the images captured by the robot as a reference image, and the pose (position and angle) of the robot at which the reference image is captured as a reference pose, performing a correction on the angles of inclination of the characteristic line segments in other images. With counting the angles of inclination of characteristic line segments in two images as an example, the robot captures a first image and counts the angles of inclination of characteristic line segments in the first image so as to obtain first statistical results, and after adjusting its pose, the robot captures a second image and counts the angles of inclination of characteristic line segments in the second image so as to obtain second statistical results. Based on this, taking the pose at which the robot captures the first image as the reference pose, based on the pose at which the robot captures the second image, the rotating angle of the current pose of the robot relative to the reference pose can be obtained through such manners as a gyroscope or VSLAM. And then, the obtained rotating angle is mapped onto the image coordinate system so as to obtain a rotating angle of the second image relative to the first image, based on the rotating angle, the angles of inclination of the characteristic line segments contained in the second statistical results are corrected, such that characteristic line segments in the second image and the characteristic line segments in the first image can be in a same coordinate system, thereby deviation of the inclination angle brought by the rotation of the robot can be eliminated. Finally, the first statistical results and the regression processed second statistical results are as a whole and a statistics is performed on the whole data, so as to obtain a final statistical result of the angle of inclination of each characteristic line segment in the image coordinate system.

Next, the control device 23 determines the relative orientation relationship between the robot and the room divider in the physical space according to the counted angles of inclination.

After the control device counts the characteristic line segments in at least one image, the control device can obtain at least one peak interval in the statistical results, and the angles of inclination corresponding to the obtained peak interval can represent the relative orientation relationship between the robot and the room divider in the physical space. Herein, a peak interval can be obtained based on the statistical results, the peak interval represents that the number of characteristic line segments corresponding to angles of inclination within the peak interval is the largest, while the largest number of characteristic line segments represents that the direction indicated by these characteristic line segments is the principal direction constructed based on the room divider. Therefore, in some embodiments, the relative orientation relationship between the robot and the room divider in the physical space can be determined according to the counted angles of inclination within the peak interval. Herein, the orientation relationship includes a deflection angle interval and a rotating direction of the robot relative to a to-be-faced room divider. For example, if the counted peak interval is 41°±1° from the U axis ray according to the preset image coordinate system, the control device determines that the deflection angle interval between the robot and the room divider indicated by the U axis is 41°±1°. It should be noted that the above angle and direction are only examples, and the present application is not limited as these.

It should be noted that, based on an image identification error and a counting error, the angle of inclination within the peak interval can be an interval in which the angles of inclination within a error range. Based on this, in one example, an average angle of inclination in the interval is used as an angle of inclination which characterizes the orientation relationship.

Please refer to FIG. 6 which shows a waveform diagram of the statistical results for the characteristic line segments and the angles of inclination of the present application in one embodiment. As shown in the figure, X axis represents angles of inclination of characteristic line segments in the image, Y axis represents the number of characteristic line segments. FIG. 6 shows that there is one maximum peak interval in the waveform diagram, and the characteristic line segments corresponding to the angle of inclination in the peak interval represents the principal direction constructed based on the room divider, for example, the principal direction can be the direction in parallel with the wall or the direction vertical to the wall. Thus, the relative orientation relationship between the robot and the room divider in the physical space can be characterized by the angle between the robot and the room divider, namely, the angle of inclination in the peak interval. For example, suppose that the angle of inclination in the peak interval is 45°, namely, the angle between the travelling direction of the robot and the wall is 45°.

Please refer to FIG. 7 which shows a waveform diagram of the statistical results for the characteristic line segments and the angles of inclination of the present application in another embodiment. As shown in the figure, X axis represents an angle of inclination of characteristic line segments in the image, Y axis represents the number of characteristic line segments. FIG. 7 shows that there are two maximum peak intervals in the waveform diagram. Theoretically, the two angles of inclination in the two peak intervals should form an angle of 90°, and the characteristic line segments corresponding to said two angles of inclination represent a direction in parallel with the wall and a direction vertical to the wall, respectively. Therefore, on the one hand, the relative orientation relationship between the robot and the room divider in the physical space can be characterized by an angle between the robot and the room divider, namely, the angle of inclination in any peak interval, on the other hand, whether the obtained characteristic line segments corresponding to the two peak intervals respectively characterize the direction in parallel with the wall and the direction vertical to the wall can be verified through judging whether the difference between two angles of inclination in two peak intervals falls within a scope of "90°±σ" (wherein, σ represents an error). For example, suppose that an angle of inclination in one peak interval is 30°, the other angle in another peak value should be 120°±σ, which indicates the angle between the travelling direction of the robot and the wall is 30° or 120°±σ.

Finally, the control device 23 adjusts the pose of the robot according to the counted angles of inclination and a current pose of the robot.

Herein, based on the angles of inclination obtained through counting and the current pose of the robot, the control device controls the robot to rotate according to corresponding angle of inclination and rotating direction, such that the travelling direction of the robot is in parallel with or vertical to the room divider, and further, the control device controls the robot to move towards or away from the room divider along the above principal direction.

According to the manners of adjusting the pose of the robot in the above examples, the control device further performs a step of planning a navigation route based on the current position of the robot when determining that the robot moves along the principal direction constructed based on the room divider in the physical space.

Wherein, the navigation route can include: a first route along which the robot moves towards the room divider, and a second route along which the robot traverses a preset region from an end point of the first route. Wherein, the preset region can be for example a cleaning region of a cleaning robot, or a patrol region of a patrol robot.

With a cleaning robot as an example, a principal direction constructed based on a room divider can be a first wall and a second wall which are vertical to each other, when determining that the cleaning robot moves along the principal direction constructed based on the room divider, the cleaning robot is set to move along the principal direction until the cleasning robot contacts with the room divider, for example, the cleaning robot is set to move towards or away from the first wall, until the cleaning robot contacts with the first wall or contacts with another wall which is in parallel with the first wall, or, the cleaning robot is set to move along with the first wall, until the cleaning robot contacts with the second wall which is vertical to the first wall. And then, with the current position of the cleaning robot as a starting point, the cleaning robot is planned to move in the cleaning region in Zigzag cleaning path, such that the cleaning robot can cover the cleaning region as fully as possible during operation, thereby the cleaning efficiency can be improved.

The present application further provides a control system of a robot. Please refer to FIG. 10 which shows a structural schematic diagram of a control system of the robot in the present application in one embodiment. As shown in the figure, the control system includes an image processing module 31, an orientation calculation module 32 and a control module 33.

Wherein, the image processing module 31 is configured to acquire at least one image captured during a movement of the robot and identify characteristic line segments in the at least one image. The orientation calculation module 32 is configured to determine a relative orientation relationship between the robot and a room divider in a physical space according to the identified characteristic line segments. The control module 33 is configured to adjust a pose of the robot according to the orientation relationship, such that the robot moves along a principal direction constructed based on the room divider in the physical space.

Based on the above technical idea and in combination with an angle between the image acquisition device and the robot i.e., a position relationship between the image acquisition device and the robot, the control device can determine the relative orientation relationship between the robot and the room divider in the physical space and adjust a pose of the robot in a way related to the angle between the image acquisition device and the robot.

In some embodiments, when the image acquisition device is arranged at the side of the robot, namely, the angle between an optic axis of the image acquisition device and the plane over which the robot moves is between 0° and 90°, the orientation calculation module 32 includes a first orientation calculation unit. The first orientation calculation unit is configured to group each characteristic line segment based on vanishing points corresponding to multiple identified characteristic line segments; select at least one group of characteristic line segments from the grouped characteristic line segments; and determine the relative orientation relationship between the robot and the room divider in the physical space according to a position of a vanishing point corresponding to the selected group of characteristic line segments in an image coordinate system.

In some other embodiments, the image acquisition device is arranged at the top of the robot and the optic axis of the image acquisition device is vertical to the plane over which the robot moves, the orientation calculation module 32 includes a second orientation calculation unit. The second orientation calculation unit is configured to count angles of inclination of characteristic line segments identified from the at least one image in a preset image coordinate system; and determine the relative orientation relationship between the robot and the room divider in the physical space according to the counted angles of inclination.

Further, the control module 33 includes a navigation route planning unit. The navigation route planning unit is configured to plan a navigation route based on a current position of the robot when determining that the robot moves along the principal direction constructed based on the room divider in the physical space.

Herein, the operating mode of each module in the control system of the present application is the same as or similar to corresponding steps in the above control method, and will not be described in detail herein.

Figure 10:
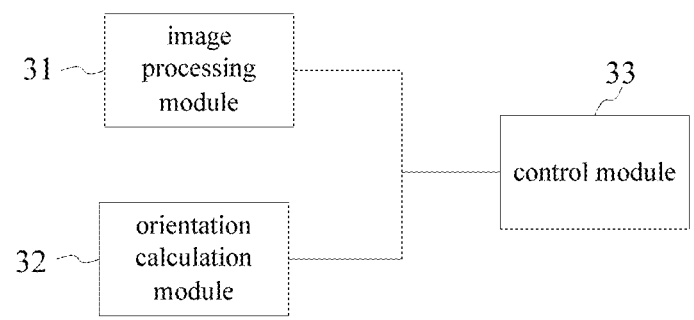
FIG. 10 shows a structural schematic diagram of a control system of a robot of the present application in one embodiment.

It should be understood that partitioning of each module of the device in the embodiment of FIG. 10 is merely a partitioning of logical function, and in the practical implementation, the modules can be completely or partially integrated onto one physical entity, or can be physically separated. Moreover, these modules can be completely implemented in the form of software being invoked by a processing element, or can be completely implemented in the form of hardware, or, some modules can be implemented in the form of software being invoked by a processing element, and other modules can be implemented in the form of hardware. For example, each module can be a separate processing element, or can also be realized by integrating into a chip in the above device. Moreover, each module can be stored in the above device in the form of program codes and can be invoked by a processing element of the above device to perform the functions of the above received module. The implementation of other modules is similar to that of the above modules. In addition, these modules can be completely or partially integrated together, or can be realized independently. The processing element herein can be an integrated circuit which can process the signals. In the implementation process, each step in the above method or each module in the above system can be performed through an integrated logic circuit in the form of hardware in a processing element or through instructions in the form of software.

For example, the above modules can be configured to be one or more integrated circuits used for performing the above method. For example: one or more application specific integrated circuits (ASIC), or one or more digital signal processors (DSP), or one or more field programmable gate arrays (FPGA). For another example, when the above any one module is implemented by a manner of invoking program codes by a processing element, the processing element can be a general-purpose processor, for example a central processing unit (CPU) or other processors which can invoke program codes. For still another example, these modules can be integrated together, and can be implemented in a form of system-on-a-chip (SOC).

It should be noted that, through the description of the above implementations, those skilled in the art can clearly understand that part or all of the present application can be realized by means of software and in combination with necessary general-purpose hardware platforms. Based on this, the present application further provides a storage medium of an computer apparatus, the storage medium stores at least one program, and when the program are executed by processor, the control method mentioned above can be performed. It should be noted that, the computer program codes can be in a form of source codes, object codes, executable files or some intermediate forms, and so on.

Based on this understanding, the technical solutions of the present application essentially or the part contributing to the prior art can be embodied in the form of a software product, the computer software product can include one or more machine readable media which store machine executable instructions thereon, when these instructions are executed by one or more machines such as a computer, a computer network or other electronic apparatus, such one or more machines can execute operations based on the embodiments of the present application, for example, executing each step in the control method of the mobile robot, etc. The machine readable media include but are not limited to, any entity or device capable of carrying the computer program codes, a recording medium, a USB, a mobile hard disk, a magnetic disk, an optical disk, a computer memory, a floppy disk, an optical disk, a CD-ROM (a compact disc-read only memory), a magnetic optical disc, an ROM (read-only memory), an RAM (random access memory), an EPROM (erasable programmable read-only memory), an EEPROM (electrically erasable programmable read-only memory), a magnetic card or optical card, a flash memory, electrical carrier signals, telecommunications signals, and software distribution media or other types of media/machine readable media suitable for storing machine executable instructions. It should be noted that, the content contained in the computer readable medium may be changed appropriately according to the requirements of legislation and patent practice in a jurisdiction. For example, in some jurisdictions, according to legislation and patent practice, computer readable media does not include electrical carrier signals and telecommunication signals. Wherein the storage media can be located in the mobile robot and can also be located in a third-party server, for example, in a server providing a certain application store. Specific application stores are not limited herein, and can be a MIUI application store, a Huawei application store, and an Apple application store, etc.

The application can be used in numerous general-purpose or special-purpose calculating system environments or configurations, for example, personal computer, server computer, handheld device or portable device, tablet device, multiprocessor system, microprocessor based system, set top box, programmable consumer electronic device, network PC, small-size computer, large-scale computer, and a distributed computing environment containing any of the above system or device.

The present application can be described in the general context of the computer executable instructions executed by the computer, such as a program module. Generally, the program module includes routines, programs, objects, components, data structures and the like which execute particular tasks or realize particular abstract data types. The present application can also be practiced in the distributed computing environments. In these distributed computing environments, tasks are executed by remote processing devices which are connected via a communication network. In the distributed computing environments, the program module can be located in a local and remote computer storage medium including a storage device.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A control device of a robot, comprising:
   a storage unit, configured to store images captured by an image acquisition device and at least one program; and
   a processing unit, connected with the storage unit, and configured to execute the at least one program to perform the following steps:
   acquiring at least one image captured during a movement of the robot and identifying characteristic line segments in the at least one image;
   determining a relative orientation relationship between the robot and a room divider in a physical space according to the identified characteristic line segments; and
   adjusting a pose of the robot according to the orientation relationship, such that the robot moves along a principal direction constructed based on the room divider in the physical space.

2. The control device of claim 1, wherein, the step of determining a relative orientation relationship between the robot and a room divider in a physical space according to the identified characteristic line segments comprises:
   grouping each characteristic line segment based on vanishing points corresponding to multiple identified characteristic line segments;
   selecting at least one group of characteristic line segments from the grouped characteristic line segments; and
   determining the relative orientation relationship between the robot and the room divider in the physical space according to a position of a vanishing point corresponding to the selected group of characteristic line segments in an image coordinate system.

3. The control device of claim 2, wherein, the step of selecting at least one group of characteristic line segments from the grouped characteristic line segments comprises:
   selecting one group of characteristic line segments with the largest number of characteristic line segments.

4. The control device of claim 2, wherein, the step of adjusting a pose of the robot according to the orientation relationship comprises:
   adjusting the pose of the robot by a preset angle step according to the orientation relationship; and
   repeating the above steps until a preset condition is satisfied, the preset condition is used to determine whether the robot moves along a principal direction constructed based on the room divider.

5. The control device of claim 4, wherein, the step of determining whether the robot moves along a principal direction constructed based on the room divider comprises:
   determining whether characteristic line segments identified from a current image satisfy a preset parallel condition, if the preset parallel condition is satisfied, determining that a pose of the robot is consistent with the principal direction constructed based on the room divider, if the preset parallel condition is not satisfied, adjusting a pose of the robot continuously and repeating the above steps until the parallel condition is satisfied.

6. The control device of claim 5, wherein, the parallel condition comprises at least one of the following conditions: a distance error between two characteristic line segments which are not on the same straight line is smaller than or equal to a preset distance error threshold, or the position of a vanishing point corresponding to the selected group of characteristic line segments falls within a preset region.

7. The control device of claim 1, wherein, the acquired at least one image is captured by an image acquisition device which is arranged to be vertical to a plane over which the robot moves, and the step of determining a relative orientation relationship between the robot and a room divider in a physical space according to the identified characteristic line segments comprises:
   counting angles of inclination of characteristic line segments identified from the at least one image in a preset image coordinate system; and
   determining the relative orientation relationship between the robot and the room divider in the physical space according to the counted angles of inclination.

8. The control device of claim 7, wherein, the step of counting angles of inclination of characteristic line segments identified from the at least one image in a preset image coordinate system comprises any of the following steps:
   counting angles of inclination of characteristic line segments in one image in the preset image coordinate system; and
   within a time period of a pose adjustment, performing a regression process on an angle of inclination of each characteristic line segment in the acquired at least two images based on a rotating angle at which the robot moves when capturing the at least two images; and counting the regression processed angle of inclination of each characteristic line segment in the preset image coordinate system.

9. The control device of claim 7, wherein, the step of determining the relative orientation relationship between the robot and the room divider in the physical space according to the counted angles of inclination comprises:
   determining the relative orientation relationship between the robot and the room divider in the physical space according to counted angles of inclination in a peak interval.

10. The control device of claim 7, wherein, the step of adjusting a pose of the robot according to the orientation relationship comprises:
    adjusting the pose of the robot according to the counted angles of inclination and a current pose of the robot.

11. The control device of claim 1, wherein, the processing unit is further configured to perform the step of planning a navigation route based on a current position of the robot when determining that the robot moves along the principal direction constructed based on the room divider in the physical space.

12. The control device of claim 11, wherein, the navigation route comprises: a first route along which the robot moves towards the room divider, and a second route along which the robot traverses a preset region from an end point of the first route.

13. A method for controlling a robot, comprising:
    acquiring at least one image captured during a movement of the robot and identifying characteristic line segments in the at least one image;
    determining a relative orientation relationship between the robot and a room divider in a physical space according to the identified characteristic line segments; and adjusting a pose of the robot according to the orientation relationship, such that the robot moves along a principal direction constructed based on the room divider in the physical space.

14. A robot, comprising:
an image acquisition device, configured to capture at least one image during a movement of the robot;
a movement device, configured to adjust a pose of the robot according to a control instruction;
a control device, connected with the image acquisition device and the movement device, and configured to perform the following steps:
acquiring at least one image captured by the image acquisition device and identifying characteristic line segments in the at least one image;
determining a relative orientation relationship between the robot and a room divider in a physical space according to the identified characteristic line segments; and
controlling the movement device to adjust a pose of the robot according to the orientation relationship, such that the robot moves along a principal direction constructed based on the room divider in the physical space.

15. The robot of claim 14, wherein, an angle between an optic axis of the image acquisition device and a plane over which the robot moves is between 0° and 90°, and the image acquisition device captures at least one image during the movement of the robot and provides the at least one image for the control device;
the step of determining a relative orientation relationship between the robot and a room divider in a physical space according to the identified characteristic line segments comprises:
grouping each characteristic line segment based on the vanishing points corresponding to multiple identified characteristic line segments;
selecting at least one group of characteristic line segments from the grouped characteristic line segments; and
determining the relative orientation relationship between the robot and the room divider in the physical space according to a position of a vanishing point corresponding to the selected group of characteristic line segments in an image coordinate system.

16. The robot of claim 14, wherein, the step of selecting at least one group of characteristic line segments from the grouped characteristic line segments comprises: selecting one group of characteristic line segments with the largest number of characteristic line segments.

17. The robot of claim 14, wherein, the step of controlling the movement device to adjust a pose of the robot according to the orientation relationship comprises:
controlling a rotating direction and a rotating angle of the movement device by a preset angle step according to the orientation relationship; and
repeating the above steps until a preset condition is satisfied, the preset condition is used to determine whether the robot moves along a principal direction constructed based on the room divider.

18. The robot of claim 14, wherein, an optic axis of the image acquisition device is vertical to a plane over which the robot moves, and the image acquisition device captures at least one image during the movement of the robot and provides the at least one image for the control device; and
the step of determining a relative orientation relationship between the robot and a room divider in a physical space according to the identified characteristic line segments comprises: counting angles of inclination of characteristic line segments identified from the at least one image in a preset image coordinate system; and
determining the relative orientation relationship between the robot and the room divider in the physical space according to the counted angles of inclination.

19. The robot of claim 14, wherein, the control device is further configured to perform the step of planning a navigation route based on a current position of the robot when determining that the robot moves along the principal direction constructed based on the room divider in the physical space.

20. The robot of claim 14, wherein, the robot is a cleaning robot.

* * * * *